United States Patent
Saitoh et al.

(10) Patent No.: US 7,695,404 B2
(45) Date of Patent: Apr. 13, 2010

(54) SHIFT CONTROL APPARATUS AND METHOD FOR AUTOMATIC TRANSMISSION OF VEHICLE

(75) Inventors: Hidenori Saitoh, Toyota (JP); Masami Kondo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 11/797,711

(22) Filed: May 7, 2007

(65) Prior Publication Data

US 2007/0270279 A1     Nov. 22, 2007

(30) Foreign Application Priority Data

May 22, 2006 (JP) .............................. 2006-141098

(51) Int. Cl.
- *F16H 59/60* (2006.01)
- *F16H 59/62* (2006.01)
- *B60W 10/00* (2006.01)
- *G06F 7/00* (2006.01)
- *G06F 17/00* (2006.01)

(52) U.S. Cl. .............................. 477/92; 477/97; 701/52; 701/55; 701/62

(58) Field of Classification Search .................... 477/92, 477/97, 118; 701/52, 55–59, 62
See application file for complete search history.

(56) References Cited

U.S. PATENT DOCUMENTS

| | | | | | |
|---|---|---|---|---|---|
| 5,873,802 | A | * | 2/1999 | Tabata et al. | 477/96 |
| 6,076,414 | A | * | 6/2000 | Tabata et al. | 74/335 |
| 6,149,546 | A | * | 11/2000 | Tabata et al. | 477/125 |

FOREIGN PATENT DOCUMENTS

| | | |
|---|---|---|
| DE | 10-2006 050 358 A1 | 5/2007 |
| JP | 63308258 A | 12/1988 |
| JP | 05196136 A | 8/1993 |
| JP | 05214976 | 8/1993 |
| JP | 10-103492 A | 4/1998 |
| JP | 10238625 A | 9/1998 |
| JP | 2000-170898 A | 6/2000 |

* cited by examiner

Primary Examiner—Tisha D Lewis
(74) Attorney, Agent, or Firm—Kenyon & Kenyon LLP

(57) ABSTRACT

When an n speed prohibition command is being output from the AI shift controlling component, the AI shift control is performed even in the S mode if the vehicle speed V is lower than the reference vehicle speed Vn, whereby busy shifting can be effectively prevented when the vehicle is running on an uphill road or cornering. When the vehicle speed V is equal to or higher than the reference vehicle speed Vn, the AI shift control is cancelled, thus minimizing the possibility of a large engine brake force being applied to the vehicle despite the intention of the driver.

3 Claims, 9 Drawing Sheets

|  | C1 | C2 | B1 | B2 | B3 | F1 |
|---|---|---|---|---|---|---|
| 1st | O |  |  | ◎ |  | △ |
| 2nd | O |  | O |  |  |  |
| 3rd | O |  |  |  | O |  |
| 4th | O | O |  |  |  |  |
| 5th |  | O |  |  | O |  |
| 6th |  | O | O |  |  |  |
| R |  |  |  | O | O |  |
| N |  |  |  |  |  |  |

◎ ENGAGED WHEN APPLYING ENGINE BRAKE
△ ENGAGED WHEN PROPELLING VEHICLE

SHIFT MAP (SHIFT MANNER)

SHIFT RANGE

| | SHIFT RANGE | SPEED |
|---|---|---|
| UP ↑ | D | 1, 2, 3, 4, 5, 6 |
| | 5 | 1, 2, 3, 4, 5 |
| | 4 | 1, 2, 3, 4 |
| | 3 | 1, 2, 3 |
| | 2 | 1, 2 |
| DOWN | L | 1 |

SHIFT CONTROL APPARATUS AND METHOD FOR AUTOMATIC TRANSMISSION OF VEHICLE

INCORPORATION BY REFERENCE

The disclosure of Japanese Patent Application No. 2006-141098 filed on May 22, 2006 including the specification, drawings and abstract is incorporated herein by reference in its entirety.

BACKGROUND OF THE INVENTION

1. Field of the Invention

The invention relates to a shift control apparatus and a shift control method for an automatic transmission of a vehicle, and particularly to improvement of a shift control apparatus and a shift control method that limit shifting of the automatic transmission based on the drive conditions of the vehicle and the driver's operations so as to appropriately control the shifting of the automatic transmission, for example, when the vehicle is running on an uphill road.

2. Description of the Related Art

A shift control apparatus for an automatic transmission, which automatically shifts the automatic transmission according to a given shift manner that is defined as, for example, a shift map using the vehicle speed and the accelerator operation amount as parameters, includes shift manner changing means for changing the shift manner based on the drive conditions of the vehicle and the driver's operations. One example of such a shift control apparatus is described in JP-A-10-238625. The shift control apparatus described in this publication, when the accelerator pedal is quickly released, holds the automatic transmission at the present speed by prohibiting upshift of the automatic transmission, so as to apply a desired drive power source brake force to the vehicle while it is cornering, or so as to eliminate the need for the automatic transmission to be shifted down to accelerate the vehicle again after cornering, that is, so as to prevent busy shifting of the automatic transmission (shifting the transmission up and down in a short period of time). As such, the shift control apparatus described in JP-A-10-238625 enables the driver to maneuver the vehicle easily when the vehicle is cornering. Another example of the shift manner changing means performs uphill and downhill drive control. Specifically, this shift manner changing means detects, based on the degree of the throttle opening, the speed of the vehicle, etc., that the vehicle is running on an uphill road or a downhill road. When the vehicle is running on an uphill road, the shift manner changing means minimizes unnecessary upshifts of the automatic transmission so that an appropriate drive power is continuously obtained. Conversely, when the vehicle is running on a downhill road, the shift manner changing means automatically shifts the automatic transmission down so that an appropriate drive power source brake force is obtained.

Typically, a shift control apparatus including such shift manner changing means has (a) an automatic shift mode in which the automatic transmission is automatically shifted using the entire shift range of the automatic transmission and (b) a manual shift mode in which the shift range of the automatic shifting performed according to the shift manner is limited according to a manual operation of the driver. In the manual shift mode, the driver manually switches the shift range of the automatic transmission among two or more shift ranges having different top speeds and the automatic transmission is automatically shifted using the speeds in each shift range selected in the manual mode. For example, when the vehicle is running on a downhill road, shifting the automatic transmission down by switching the shift range of the automatic transmission to a lower shift range increases the drive power source brake force. Meanwhile, in the automatic shift mode, the shift manner changing means changes the shift manner so as to enable the driver to maneuver the vehicle as easily as possible. Usually, in the manual shift mode, the shift manner changing means does not change the shift manner because the driver wishes to shift the automatic transmission as he or she intends in the manual shift mode.

However, in some of automatic transmissions having such a manual shift mode, even when the manual shift mode is selected, the automatic shifting is performed in the shift ranges except a specific high-speed shift range or ranges, and therefore, busy shifting sometimes occurs depending upon the drive conditions of the vehicle, as it does in the automatic shift mode. Because such busy shifting is not intended by the driver, it is desirable, to perform the control for preventing busy shifting as in the automatic shift mode. However, if the control of the shift manner changing means is used in the manual shift mode as it is, it may cause the automatic transmission to be shifted down or held at a specific speed despite the intention of the driver, which impairs the advantage of the manual shift mode. The shift manner changing means does not always perform the control for preventing busy shifting and the control of the drive power source brake force separately. That is, the shift manner changing means performs these controls cooperatively under given conditions, such as when the vehicle is running on an uphill road and when the vehicle is cornering. Therefore, it is difficult to extract the busy-shifting preventing function and use it in the manual shift mode. Meanwhile, because there are a large number of vehicle models, it takes a tremendous amount of time and cost to prepare a new control program that is exclusively used to prevent busy shifting in the manual shift mode, so it is not realistic.

It is an object of the invention to provide a shift control apparatus and a shift control method for an automatic transmission including shift manner changing means for controlling the drive power source brake and preventing busy shifting of the automatic transmission, which provides a busy-shifting preventing function for the manual shift mode in a simple form and at a low cost by utilizing the shift manner changing means.

SUMMARY OF THE INVENTION

A first aspect of the invention relates to a shift control apparatus for an automatic transmission for a vehicle, the automatic transmission having (a) an automatic shift mode in which the automatic transmission is automatically shifted using the entire shift range of the automatic transmission in a predetermined shift manner and (b) a manual shift mode in which the shift range of the automatic shifting that is performed in the predetermined shift manner is limited in response to a manual operation by a driver, the automatic shift mode and the manual shift mode being selectable by the driver. The shift control apparatus includes: shift manner changing means for changing the shift manner based on at least one of a drive condition of a vehicle and an operation by the driver; and change limiting means for prohibiting the shift manner to be changed by the shift manner changing means. The shift manner changing means changes the shift manner in both the automatic shift mode and the manual shift mode, and the change limiting means prohibits the shift manner to be changed by the shift manner changing means when the speed of the vehicle is less than a reference vehicle speed in the manual shift mode.

In the shift control apparatus according to the first aspect of the invention, the reference vehicle speed may be set such that the shift manner is prohibited to be changed by the shift manner changing means when the speed of the vehicle is in a vehicle speed range in which a drive power source is placed in a predetermined driven state if the shift manner is changed.

In the shift control apparatus according to the first aspect of the invention, the shift manner changing means may perform a control for changing the shift manner so as to prevent busy shifting of the automatic transmission that is caused when the automatic transmission is automatically shifted and a control for changing the shift manner so as to obtain a desired drive power source brake force. The busy-shifting preventing control and the drive power source brake control may be performed cooperatively.

In the shift control apparatus according to the first aspect of the invention, the shift manner changing means changes the shift manner of the automatic transmission even when the manual shift mode is selected. Therefore, the shifting of the automatic transmission can be appropriately controlled in the manual shift mode based on the drive conditions of the vehicle and the driver's operations, so that busy shifting of the automatic transmission is effectively prevented, for example. Also, the change limiting means prohibits the shift manner to be changed by the shift manner changing means when the speed of the vehicle is less than the reference vehicle speed. In this case, because the shift manner is not changed, the automatic transmission is not shifted down or held at a specific speed in response to a change of the shift manner, and therefore the possibility of a large drive power source brake force being applied to the vehicle despite the intention of the driver is minimized. More specifically, because a drive power source brake force occurs when the speed of the vehicle, which is determined from the degree of the throttle opening, the speed ratio of the automatic transmission, etc., is less than a specific speed, by appropriately setting the reference vehicle speed that is used when prohibiting the shift mode to be changed by the shift manner changing means, the function for controlling the drive power source brake can be deactivated or limited while maintaining the function for preventing busy shifting of the automatic transmission.

For example, the shift manner changing means may have a busy-shifting preventing function for changing the shift manner so as to prevent busy shifting of the automatic transmission which may be caused when the automatic transmission is automatically shifted and a drive power source brake controlling function for changing the shift manner so as to obtain a desired drive power source brake force. In this case, the busy-shifting preventing function and the drive power source brake controlling function are not always used separately, but cooperate with each other under given conditions, such as when the vehicle is running on an uphill road, when the vehicle is cornering, and when the accelerator pedal is quickly released. As such, when the drive power source brake controlling function is limited, it may affect the busy-shifting preventing function in some way. However, by appropriately setting the reference vehicle speed that is used when prohibiting the shift manner to be changed by the shift manner changing means, busy shifting of the automatic transmission can be effectively prevented, for example, when the vehicle is running on the drive power of the drive power source (power-On drive) on a flat road. Meanwhile, the reference vehicle speed is not necessarily set so as to deactivate the drive power source brake controlling function completely, but the reference vehicle speed may be set so as to deactivate only a part of the drive power source brake controlling function. For example, the reference vehicle speed may be set so as to limit the use of the drive power source brake controlling function such that, when the driver releases the accelerator pedal quickly while the vehicle is cornering, the drive power source brake controlling function is activated to hold the automatic transmission at a specific speed so as to obtain a desired drive power source brake force, but when the vehicle is running on a downhill road and there is a possibility that a large drive power source brake would occur if the automatic transmission is automatically shifted down, the drive power source brake controlling function is deactivated.

In the shift control apparatus according to the first aspect of the invention, the shift manner changing means changes the shift mode in the manual shift mode as well as in the automatic shift mode. However, a busy-shifting preventing function for the manual shift mode can be obtained by simply prohibiting, during the manual shift mode, the shift manner to be changed by the shift manner changing means when the speed of the vehicle is less than the reference vehicle speed. That is, the shift control apparatus according to the first aspect of the invention provides a busy-shifting preventing function for the manual shift mode in a simple manner and at a low cost as compared to when a new control program for preventing busy shifting in the manual shift mode is additionally prepared and when the busy-shifting preventing function is extracted from the shift manner changing means and used.

Further, in the shift control apparatus according to the first aspect of the invention, the reference vehicle speed may be set such that the shift manner is prohibited to be changed by the shift manner changing means when the speed of the vehicle is in a vehicle speed range in which a drive power source is placed in a predetermined driven state if the shift manner is changed. According to this structure, the drive power source brake controlling function can be deactivated or limited while maintaining the busy shifting preventing function, thus minimizing the possibility of a large drive power source brake force being applied to the vehicle despite the intention of the driver.

Further, in the shift control apparatus according to the first aspect of the invention, even though the busy-shifting preventing function and the drive power source brake controlling function of the shift manner changing means cooperate with each other, because the shift manner is prohibited to be changed by the shift manner changing means when the speed of the vehicle is less than the reference vehicle speed in the manual shift mode, the drive power source brake controlling function can be deactivated or limited while maintaining the busy shifting preventing function, thus minimizing the possibility of a large drive power source brake force being applied to the vehicle despite the intention of the driver.

The automatic transmission may be a planetary-gear-based automatic transmission including a plurality of planetary gearsets or may be a parallel-shaft type automatic transmission. Any multi-speed automatic transmission that is shifted using two or more speeds having different speed ratios by selectively applying and releasing friction coupling devices and/or synchronous clutches may be used in the invention. In particular, the advantage of the invention will be significant when the invention is applied to a multi-speed automatic transmission having six or more speeds, because such an automatic transmission tends to frequently shift among the several speeds and therefore it is likely that busy shifting of the automatic transmission occurs even when the vehicle is running on the drive power from the drive power source (power-On drive). Here, it is to be noted that the invention can also be applied to a continuously variable transmission if the control system for the continuously variable transmission has shift manner changing means for preventing unnecessary or unintended shifts of the transmission (busy shifting) and performing a specific control of the drive power source brake.

The shift manner that is used when automatically shifting the automatic transmission in the automatic shift mode and the manual shift made may be defined as, for example, a specific shift map or a predetermined formula, each of which uses, as its parameters, the values indicating the drive conditions of the vehicle, such as the speed of the vehicle, the accelerator operation amount, and the degree of throttle opening. Typically, in the manual shift mode, the driver selects the shift range of the automatic transmission from among two or more shift ranges having different top speeds. Thus, the manual shift mode includes any shift modes in which the driver can manually select the shift range of the transmission from among two or more shift ranges, regardless of how they are be called (e.g., sport mode, sequential mode (S mode)).

For example, the shift manner changing means may include a busy-shifting preventing function for changing the shift manner so as to prevent busy shifting of the automatic transmission and a drive power source brake controlling function for changing the shift manner so as to obtain a desired drive power source brake force. Under given conditions, such as when the vehicle is running on an uphill road, when the vehicle is cornering, and when the accelerator is quickly released, the busy-shifting preventing function and the drive power source brake controlling function cooperate so as to prevent busy shifting that may make the driver feel uncomfortable and to achieve a vehicle drive state (including the state of drive power source brake) that meets the intention of the driver. As a result, the driveability of the vehicle improves, and the automatic transmission can be automatically shifted in a more appropriate manner in accordance with the road conditions and the driver's intentions. That is, for example, the shift manner changing means limits upshifting of the automatic transmission by adjusting the upper limit of the shift range and obtains a desired drive power source brake force by shifting the automatic transmission down.

The change limiting means prohibits the shift manner to be changed by the shift manner changing means. This prohibition for changing the shift manner is in effect when the speed of the vehicle is within a predetermined vehicle speed range. For example, the shift manner is prohibited to be changed by the shift manner changing means when the speed of the vehicle is in a vehicle speed range in which the drive power source is placed in a specific driven state if the shift manner is changed by the shift manner changing means. In this case, by prohibiting changing the shift manner in that vehicle speed range, the drive power source brake controlling function is limited. The reference vehicle speed is not necessarily set so as to deactivate the drive power source brake controlling function completely. That is, the reference vehicle speed may be set so as to deactivate only a part of the drive power source brake controlling function. Also, the reference vehicle speed may be set so as to obtain a desired busy-shifting preventing function, by factoring in the type and characteristic of the vehicle, the functions of the shift manner changing means, and so on. In any case, the drive power source brake controlling function is limited according to the reference vehicle speed.

The reference vehicle speed may be set constant for each speed (speed ratio) of the automatic transmission that the shift manner changing means prohibits to be used, on the assumption that the accelerator is fully released. However, because in some cases a drive power source brake force occurs while the accelerator is being operated, the reference vehicle speed may be variably determined using the operation amount of the accelerator as a parameter.

It is not always advantageous to enable the shift mode to be changed by the shift manner changing means also in the manual shift mode in order to obtain a busy-shifting preventing function for the manual shift mode. For example, such a busy-shifting preventing function is not always necessary for some vehicles designed for sports driving. That is, the degree of the effect of having such a busy-shifting preventing function in the manual mode varies depending upon the type and characteristics of each vehicle. To cope with this, an execution switch for identifying, on a control program, whether to allow the shift mode of the automatic transmission to be changed in the manual mode may be provided. In this case, the shift manner changing means is allowed to change the shift mode of the automatic transmission in the manual shift mode only when the execution switch is set to the ON position (i.e., the execution position). By having such an execution switch, a common control program can be shared in different vehicles regardless of whether it is necessary to change the shift mode in the manual shift mode in each vehicle, and therefore the cost for developing programs decreases. Also, the shift control apparatus may be modified so as to enable the driver to choose whether to allow the shift manner changing means to change the shift mode in the manual shift mode.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 illustrates the shift control performed by the regular shift controlling means, where

DETAILED DESCRIPTION OF THE EXEMPLARY EMBODIMENTS

Figures 1, 2:
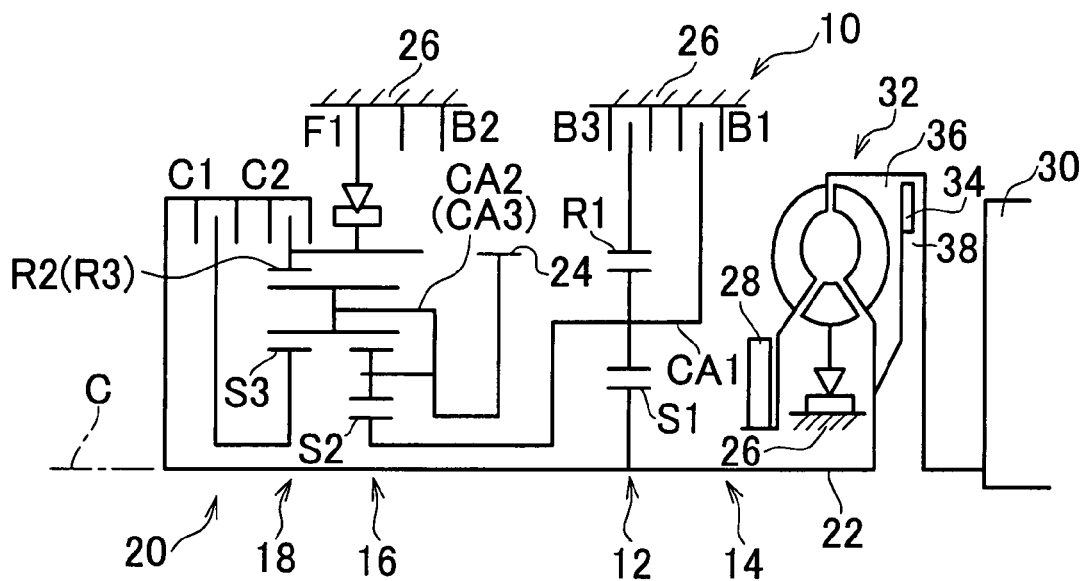
FIG. 1 is a diagram showing the configuration of an exemplary automatic transmission for a vehicle, to which the invention is preferably applied.
FIG. 2 is an engagement chart indicating the application states of the friction-coupling devices of the automatic transmission shown in FIG. 1 when each speed is selectively established from among a plurality of speeds.

Hereinafter, exemplary embodiments of the invention will be described in detail with reference to the accompanying drawings. FIG. 1 is a diagram showing the configuration of an automatic transmission 10 for a vehicle, and FIG. 2 is an engagement chart indicating the application states of the friction-coupling elements (i.e., friction-coupling devices) of the automatic transmission 10 when each speed of the automatic transmission 10 is selectively established from among a plurality of speeds. The automatic transmission 10 is mounted on the vehicle so as to extend between the left side and the right side of the vehicle (transverse-mounted) and is preferably used in FF (Front-engine Front-drive) vehicles. The automatic transmission 10 has a first shift block 14 mainly composed of a first planetary gearset 12 (a single pinion type planetary gearset) and a second shift block 20 that is formed by a ravigneaux type planetary gear assembly mainly composed of a second planetary gearset 16 (a double pinion type planetary gearset) and a third planetary gearset 18 (a single pinion type planetary gearset). The first shift block 14 and the second shift block 20 are provided along a common axis C in a transmission case 26 that is fixed to the vehicle body as a non-rotational component. The rotation of an input shaft 22 is output from a rotational output member 24 while changing the rotation speed thereof. The input shaft 22 is the input member of the automatic transmission 10, and in this exemplary embodiment, the input shaft 22 is a turbine shaft of a torque converter 32. The rotational output member 24 is the output member of the automatic transmission 10, which serves as a differential drive gear that meshes with a differential driven gear (a large-diameter gear) of a differential unit 40 shown in FIG. 3 and transmits drive power to the differential unit 40. The output of an engine 30 is transmitted to a pair of drive wheels 46 via the torque converter 32, the transmission 10, the differential unit 40, and a pair of drive axles 44 (See FIG. 3). The automatic transmission 10 and the torque converter 32 are substantially symmetrical about the axis C. Note that the lower halves of the automatic transmission 10 and the torque converter 32 are not shown below the axis C the in FIG. 1.

The torque converter 32 is provided with a lock-up clutch 34 that enables the drive power of the engine 30 to be directly transmitted to the input shaft 22 without fluid coupling. The lock-up clutch 34 is a hydraulically driven friction clutch that is frictionally engaged by a differential pressure $\Delta P$ between the hydraulic pressure in an engagement-side hydraulic chamber 36 and the hydraulic pressure in a release-side hydraulic chamber 38. When the lock-up clutch 34 is fully engaged, the drive power of the engine 30 is directly transmitted to the input shaft 22. Also, by appropriately setting the differential pressure $\Delta P$, that is, by appropriately setting the torque capacity of the lock-up clutch 34 through its feedback control, the lock-up clutch 34 is placed in a slip-engaged state where the turbine shaft (the input shaft 22) of the lock-up clutch 34 rotates together with the output rotational member of the engine 30 (crank shaft), but at a speed that is lower than the rotation speed of the output rotational member by, for example, about 50 rpm (slipping amount).

In the automatic transmission 10, a desired speed is established from among six forward speeds "1st" to "6th" and a reverse speed "R", according to the engagement states of the respective rotational elements (sun gear S1 to S3, carrier CA1 to CA3, ring gear R1 to R3) of the first shift block 14 and the second shift block 20. Referring to the engagement chart in FIG. 2, for example, regarding the forward speeds of the automatic transmission 10, the first speed "1st" is established when a clutch C1 and a brake B2 are engaged, the second speed "2nd" is established when the clutch C1 and a brake B1 are engaged, the third speed "3rd" is established when the clutch C1 and a brake B3 are engaged, the fourth speed "4th" is established when the clutch C1 and a clutch C2 are engaged, the fifth speed "5th" is established when the clutch C2 and a brake B3 are engaged, and the sixth speed "6th" is established when the clutch C2 and the brake B1 are engaged. The reverse-drive speed "R" is established when the brake B2 and the brake B3 are engaged. The automatic transmission 10 is placed in the neutral state when the clutches C1, C2 and the brakes B1, B2, B3 are all disengaged.

The engagement chart in FIG. 2 illustrates the relations between the respective speeds of the automatic transmission 10 and the engagement states of the clutches C1, C2 and the brakes B1, B2, B3. In this chart, the circles represent "engaged" and the double circles represent "engaged only for engine brake". A one-way clutch F1 is provided in parallel to the brake B2 that is engaged when establishing the first speed "1st", only the clutch C1 is engaged when starting to propel the vehicle (when accelerating the vehicle), and the clutch C1 and the brake B2 are both engaged when applying engine brake. The speed ratio at each speed of the automatic transmission 10 is determined according to the gear ratio $\rho 1$ of the first planetary gearset 12, the gear ratio $\rho 2$ of the 16, and the gear ratio $\rho 3$ of the third planetary gearset 18. Note that the gear ratio of each planetary gearset is defined as "the number of the gear teeth of the sun gear/the number of the gear teeth of the ring gear).

As described above, in this exemplary embodiment, the automatic transmission 10 is shifted using the several speeds having different speed ratios by selectively engaging the coupling devices, i.e., the clutches C1, C2 and the brakes B1, B2, B3. That is, as evident from the engagement chart in FIG. 2, the automatic transmission 10 is shifted from one speed to other speed by a so-called clutch-to-clutch shifting, i.e., by switching two engaged coupling devices among the clutches C1, C2 and the brakes B1, B2, B3. Each of the clutches C1, C2 and the brakes B1, B2, B3 (which will be simply referred to as "clutches C" and "brakes B" unless otherwise specified) is a hydraulically driven frictional coupling device, such as a multi-disc clutch, which is engaged by a hydraulic actuator. By the energizing control and the current control of linear solenoid valves SL1 to SL5 of a hydraulic control circuit 50 shown in FIG. 3, the hydraulically-driven frictional coupling devices, that is, the clutches C and the brakes B are engaged and released and the transient hydraulic pressure that occurs while each clutch C or each brake B is being engaged or released is controlled.

Figure 3:
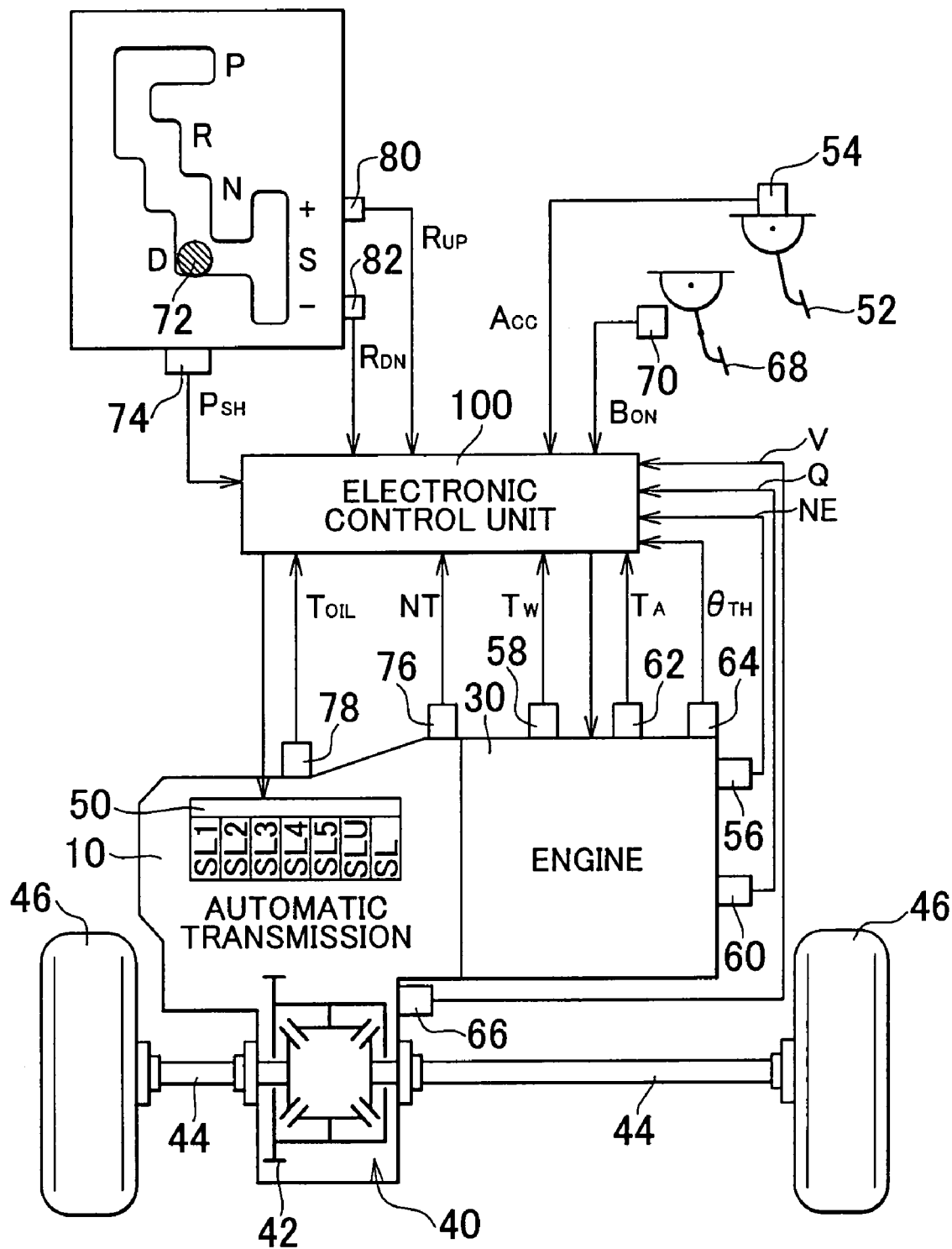
FIG. 3 is a diagram schematically showing the main components of the control system for the automatic transmission of the vehicle.

FIG. 3 is a block diagram showing the main components of the control system that is provided in the vehicle to control the automatic transmission 10 and others and the outline of the configuration of the power train that extends from the engine 30 to the drive wheels 46.

Referring to FIG. 3, an electronic control unit 100 includes, for example, a CPU (Central Processing Unit), a RAM (Random Access Memory), a ROM (Read Only Memory), an input interface, an output interface, and so on. The CPU executes the output control of the engine 30, the shift control of the automatic transmission 10, the on-off control of the lock-up clutch 34, and so on, by processing various signals on the programs pre-stored in the ROM while using the temporary memory function of the RAM. If appropriate, the electronic control unit 100 may be provided as a combination of separate control units, such an engine control unit, a shift control unit that controls the linear solenoid valves SL1 to SL5, and a lock-up clutch control unit that controls a linear solenoid valve SLU and a solenoid valve SL in the hydraulic pressure control circuit 50.

The electronic control unit 100 receives various signals such as: accelerator operation amount signals indicating the operation amount of an accelerator pedal 52, which is detected by an accelerator sensor 52; signals indicating an engine speed NE corresponding to the rotation speed of the engine 30, which is detected by an engine speed sensor 56; signals indicating a coolant temperature $T_W$ of the engine 30, which is detected by a coolant temperature sensor 58; signals indicating an intake amount Q, which is detected by an intake amount sensor 60; signals indicating a temperature $T_A$ of intake air, which is detected by an intake temperature sensor 62; throttle opening signals indicating the degree of opening of an electronic throttle valve, which is detected by a throttle opening sensor 64; vehicle speed signals indicating a vehicle speed V, i.e., a rotation speed $N_{OUT}$ of the rotational output member 24, which is detected by a vehicle speed sensor 66; signals indicating an operation $B_{ON}$ of a foot brake (wheel brake), as a regular brake, when the foot brake is being operated (stepped sown), which is detected by a brake switch 70; signals indicating a lever position $P_{SH}$ (operation position, shift position) of a shift lever 72, which is detected by a lever position sensor 74; signals indicating a turbine speed NT (=rotation speed $N_{IN}$ of the input shaft 22), which is detected by a turbine speed sensor 76; signals indicating an AT fluid temperature $T_{oil}$ that is the temperature of the hydraulic fluid in the hydraulic pressure control circuit 50, which is detected by an AT fluid temperature sensor 78; signals indicating an upshift command $R_{UP}$ for shifting the shift range up, which is detected by an upshift switch 80; and signals indicating an downshift command $R_{DOWN}$ for shifting the shift range down, which is detected by an downshift switch 82.

On the other hand, the electronic control unit 100 outputs various signals, such as: drive signals to a throttle actuator that drives the electronic throttle valve to change its opening degree $\theta_{TH}$, ignition signals that specify the ignition timing of the engine 30, fuel supply amount signals that controls the amount of fuel supplied to the engine 30 from the fuel supply device that supplies fuel into an intake passage of the engine 30 or into each combustion chamber of the engine 30, lever position $P_{SH}$ indicating signals for an shift indicator, signals for controlling the solenoids that drive the shift valves in the hydraulic pressure control circuit 50 so as to shift the automatic transmission 10 from one speed to other speed, command signals for driving the linear solenoid valves that control the line pressure, and command signals for driving the linear solenoid valves that control engagement and disengagement of the lock-up clutch 34 and control the slipping amount of the lock-up clutch 34.

The shift lever 72 is arranged close to the driver's seat and is manually shifted to a selected one of five lever positions, "P", "R", "N", "D", and "S".

The "P" position is the parking position at which the automatic transmission 10 is in a neutral state where the power transmission path in the automatic transmission 10 is disconnected, that is, the power transmission through the automatic transmission 10 is interrupted, and the rotational output member 24 is mechanically locked by a mechanical parking mechanism so as not to rotate. The "R" position is the reverse-drive position for propelling the vehicle in the reverse direction. The "N" position is the neutral position at which the power transmission through the automatic transmission 10 is interrupted. The "D" position is the forward-drive position that establishes the automatic shift mode (D range) in which the automatic transmission 10 is shifted using all the forward speeds "1st" to "6th". The "S" position is the forward-drive position that establishes a sequential mode in which manual shift control of the automatic transmission 10 can be performed by selecting a desired shift range from among several shift ranges each having a specifically limited range of forward-drive speeds. When the shift lever is at the "S" position, the shift range is shifted up each time the shift lever 72 is operated to an upshift position "+" and is shifted down each time the shift lever 72 is operated to a downshift position "−". Such upshift and downshift operations of the shift lever 72 are detected by the upshift switch 80 and the downshift switch 82, respectively. Regarding the structures for the upshift position "+" and the downshift position "−", when the shift lever 72 is shifted to the upshift or downshift position, it is not retained at that position, but is automatically brought back to the "S" position by urging means such as a spring, Thus, the shift range is changed in accordance with the number of times the shift lever 72 is operated to the upshift position "+" or to the downshift position "−" or the time over which the shift lever 72 is held at each position. This "S" mode corresponds to the manual shift mode.

Figure 4:
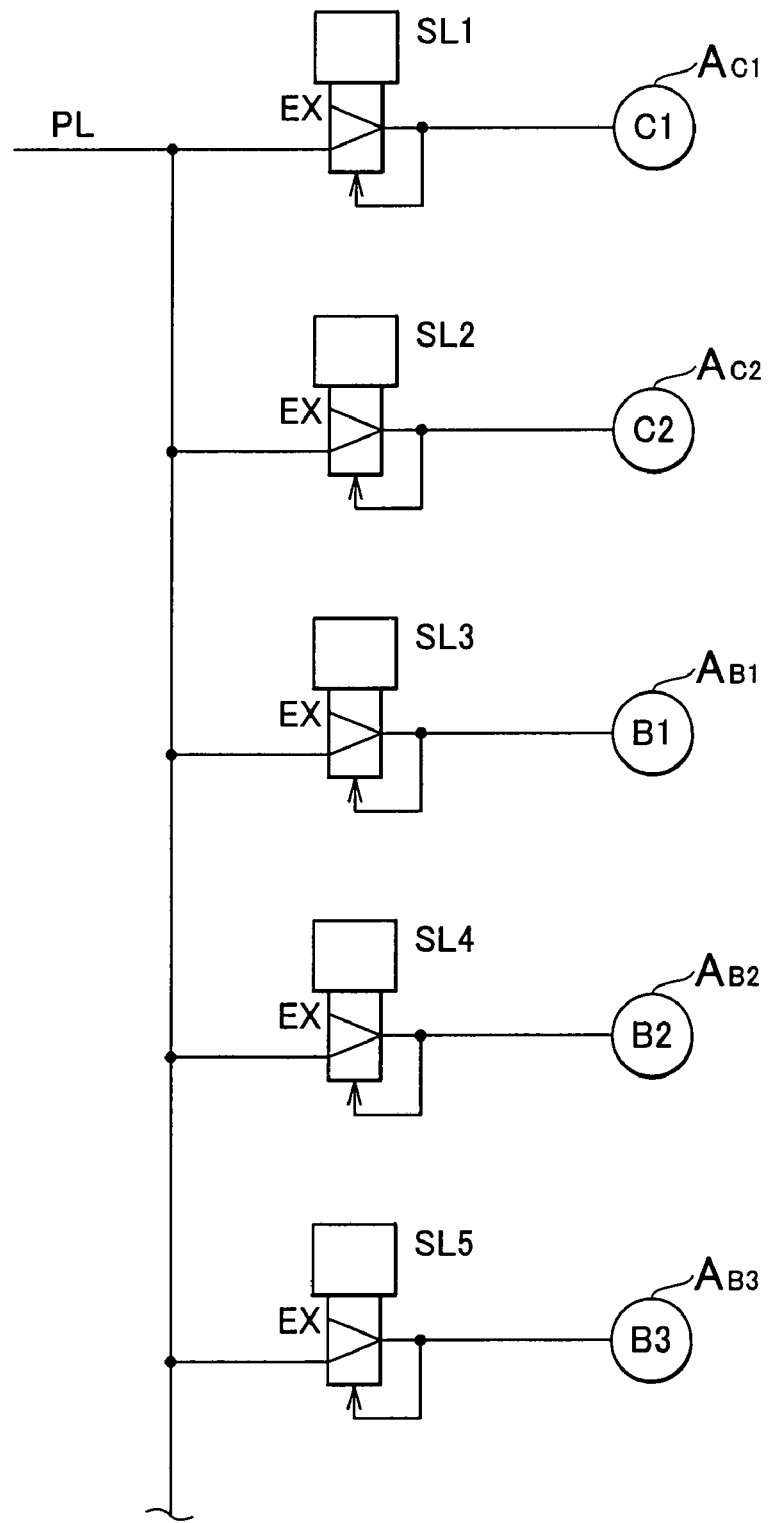
FIG. 4 is a circuit diagram showing a portion of the hydraulic pressure control circuit shown in FIG. 3 for the linear solenoid valves SL1 to SL6 that control the operation of the hydraulic actuators provided for the clutches C1, C2, and the brakes B1, B2, B3.

FIG. 4 is a circuit diagram showing a portion of the hydraulic pressure control circuit 50 for the linear solenoid valves SL1 to SL5 that control the operation of the hydraulic actuators (hydraulic cylinders) $A_{C1}$, $A_{C2}$, $A_{B1}$, $A_{B2}$, $A_{B3}$ that are provided for the clutches C1, C2 and the brakes B1, B2, B3, respectively. The linear solenoid valves SL1 to SL5 adjust the hydraulic line pressure PL to obtain engagement pressures $P_{C1}$, $P_{C2}$, $P_{B1}$, $P_{B2}$, $P_{B3}$ in accordance with the command signals from the electronic control unit 100 and directly supply the engagement pressures $P_{C1}$, $P_{C2}$, $P_{B1}$, $P_{B2}$, $P_{B3}$ to the hydraulic actuators (hydraulic cylinders) $A_{C1}$, $A_{C2}$, $A_{B1}$, $A_{B2}$, $A_{B3}$, respectively. The hydraulic line pressure PL is obtained by adjusting, through a relief-type regulator valve not shown in the drawings, the hydraulic pressure (base pressure) produced by a mechanical oil pimp 28 shown in FIG. 1, which is rotated by the engine 30, to a value corresponding to the engine load defined by the accelerator operation amount Acc and the throttle opening degree $\theta_{TH}$. The linear solenoid valves SL1 to SL5 have a substantially common structure. The linear solenoid valves SL1 to SL5 are separately energized by the electronic control unit 100 so as to adjust the hydraulic pressures to the hydraulic actuators $A_{C1}$, $A_{C2}$, $A_{B1}$, $A_{B2}$, $A_{B3}$ separately, and thus to control the apply pressures $P_{C1}$, $P_{C2}$, $P_{B1}$, $P_{B2}$, $P_{B3}$ for the clutches C1, C2, and the brakes B1, B2, B3 accordingly. As such, each speed of the automatic transmission 10 is established by engaging the clutch C and the brake B as indicated in the engagement chart of FIG. 2.

Figure 5:
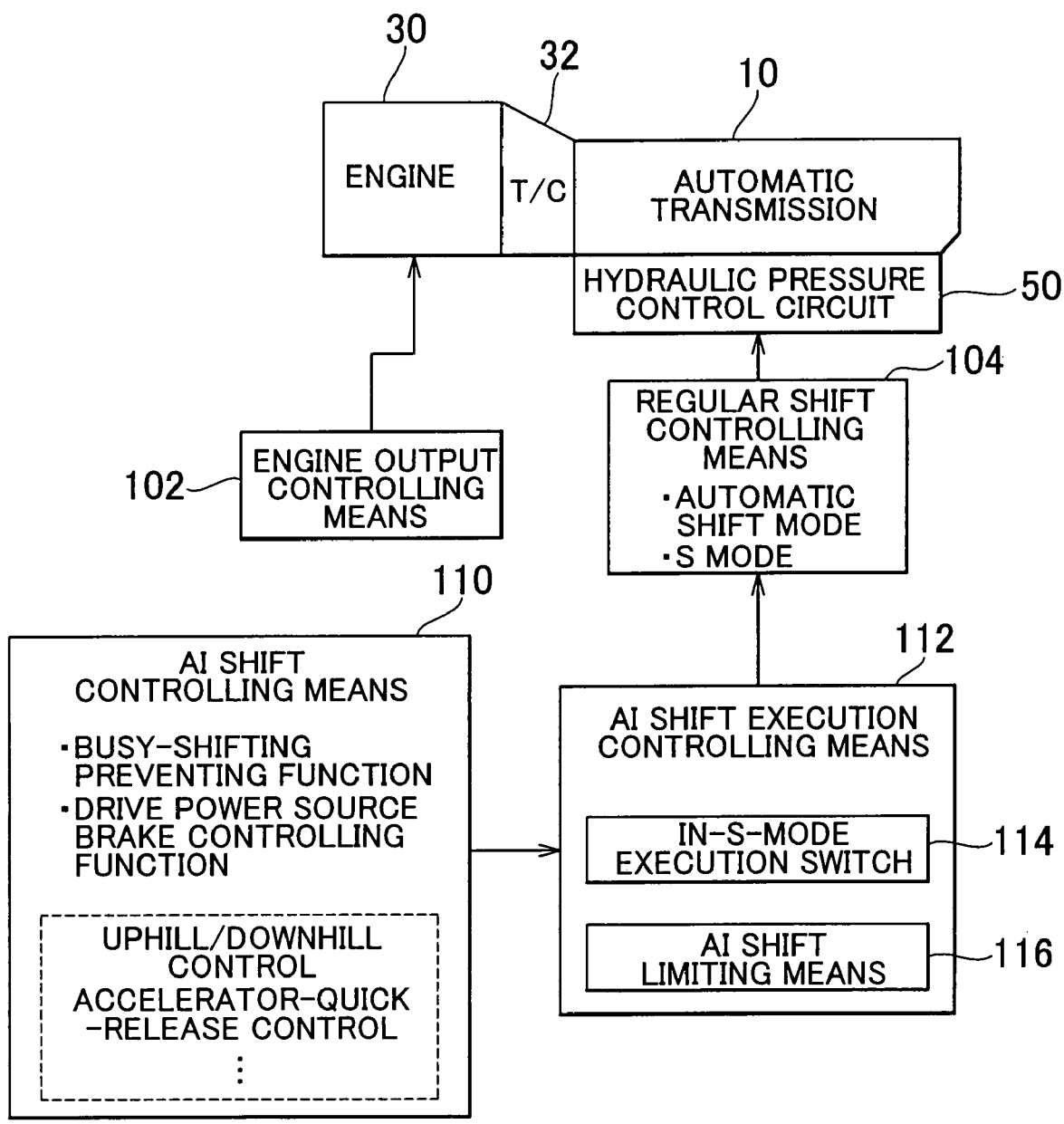
FIG. 5 is a block diagram showing the main control sections of the electronic control unit shown in FIG. 3.

FIG. 5 is a block diagram showing the main control sections of the electronic control unit 100. Referring to FIG. 5, engine output controlling means 102 controls the output of the engine 30 by executing the throttle control in which the throttle actuator is controlled to open and close the electronic throttle valve, the fuel injection control in which fuel injection is controlled, and the spark timing control in which the spark timing of an igniter is controlled, or the like. In the throttle control, the throttle actuator is driven in accordance with the accelerator operation amount Acc based on various information stored in the electronic control unit 100 and the throttle valve opening degree $\theta_{TH}$ is increased as the accelerator operation amount Acc increases.

Figures 6A, 6B:
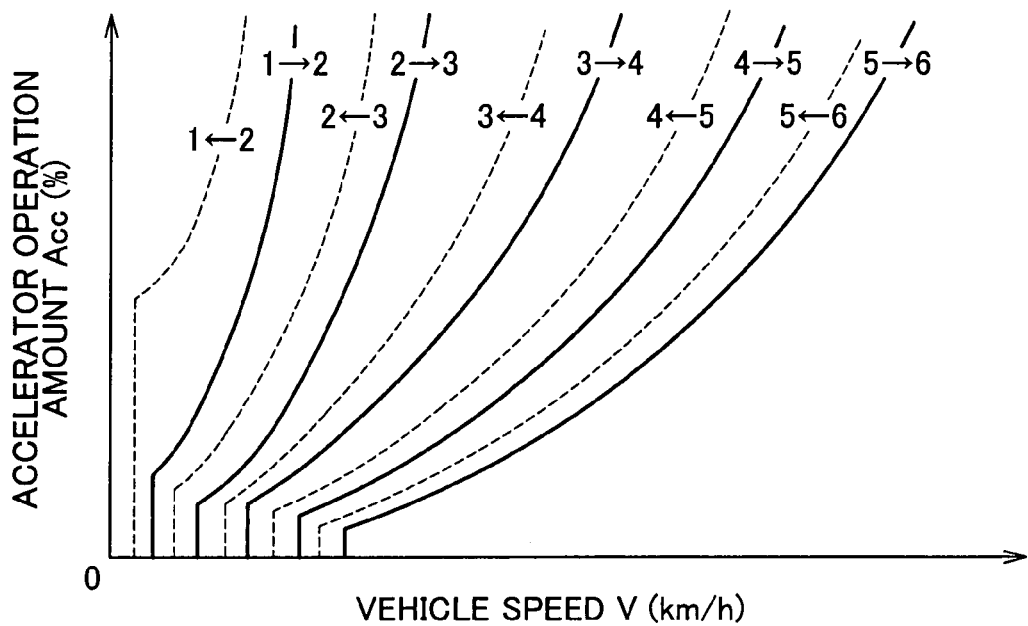
FIG. 6A is an example of a shift map and FIG. 6B is a table indicating the speed or speeds of the automatic transmission that is used in each shift range.

Regular shift controlling means 104 controls the shifting of the automatic transmission 10. The automatic shift mode (D range) is activated when the shift lever 72 is operated to the "D" position. In the automatic shift mode, the automatic transmission 10 is automatically shifted using all the forward-drive speeds "1st" to "6th" based on a shift map shown in FIG. 6A, which is prepared in advance and use, as its parameters, the vehicle speed V and the accelerator operation amount Acc. The shift map shown in FIG. 6A corresponds to a shift manner. Referring to FIG. 6A, the solid lines represent shift curves each defining upshift of the automatic transmission 10 (upshift curves) and the broken lines represent shift curves each defining downshift of the automatic transmission 10 (downshift curves). Meanwhile, the S mode is activated when the shift lever 72 is operated to the "S" position. In the S mode, the shift range of the automatic transmission 10 is electrically shifted among the six shift ranges "D", "5", "4", "3", "2", and "L" each having a different top speed, i.e., a different lowest-ratio speed, as indicated in FIG. 6B, according to the upshift commands $R_{UP}$ and the downshift commands $R_{DOWN}$. In each of the six shift ranges, the speed of the automatic transmission 10 is automatically shifted based on the shift map shown in FIG. 6A. As such, in the S mode, for example, by operating the shift lever 72 to the downshift position "−" repeatedly, the shift range of the automatic transmission 10 is shifted down from the "4" range to the "3" range, to the "2" range, and then to "L" range, so that the speed of the automatic transmission 10 shifts down from the forth speed "4th" to the third speed "3rd", to the second speed "2nd", and then to the first speed "1st", increasing the engine brake force accordingly. In the S mode, the brake B2 is also applied to establish the first speed "1st" in order to apply engine brake to the vehicle.

The electronic control unit 100 includes AI (Artificial Intelligence) shift controlling means 110 and AI shift execution controlling means 112 that are used for the shift control of the automatic transmission 10. The AI shift controlling means 110 corresponds to regular shift manner changing means for changing the manner in which the regular shift controlling means 104 controls the automatic shifting of the automatic transmission 10 based on the shift map of FIG. 6A and in accordance with the drive conditions, such as the road inclination, and the driver's operations, such as the operation of the accelerator pedal, the operation of the brake pedal, the operation of the steering wheel (steering angle), and so on. In this exemplary embodiment, the AI shift controlling means 110 has a busy-shifting preventing function for preventing busy shifting of the automatic transmission 10 by changing the shift manner of the automatic transmission 10 and a drive power source brake controlling function for obtaining a predetermined engine brake force by changing the shift manner of the automatic transmission 10. The busy-shifting preventing function and the drive power source brake controlling function cooperate with each other under given conditions, such as when the vehicle is running on an uphill road, when the vehicle is cornering, and when the driver quickly releases the accelerator pedal, so as to prevent busy shifting of the automatic transmission 10 which may otherwise make the driver feel uncomfortable and to achieve a vehicle drive state (including the state of engine brake) that meets the intention of the driver. Thus, the busy-shifting preventing function and the drive power source brake controlling function of the AI shift controlling means 110 make it possible to perform the automatic shift control of the automatic transmission 10 more appropriately in accordance with the road conditions and the driver's intentions. More specifically, these functions temporarily prohibit the use of the n speed or speeds of the automatic transmission 10 that is higher than n speed, in order to limit upshifting of the automatic transmission 10 when the driver is quickly releasing the accelerator pedal while the vehicle is cornering or when the vehicle is running on an uphill road, or in order to shift the automatic transmission 10 down to obtain a desired engine brake force when the vehicle is running on a downhill road.

Figure 7:
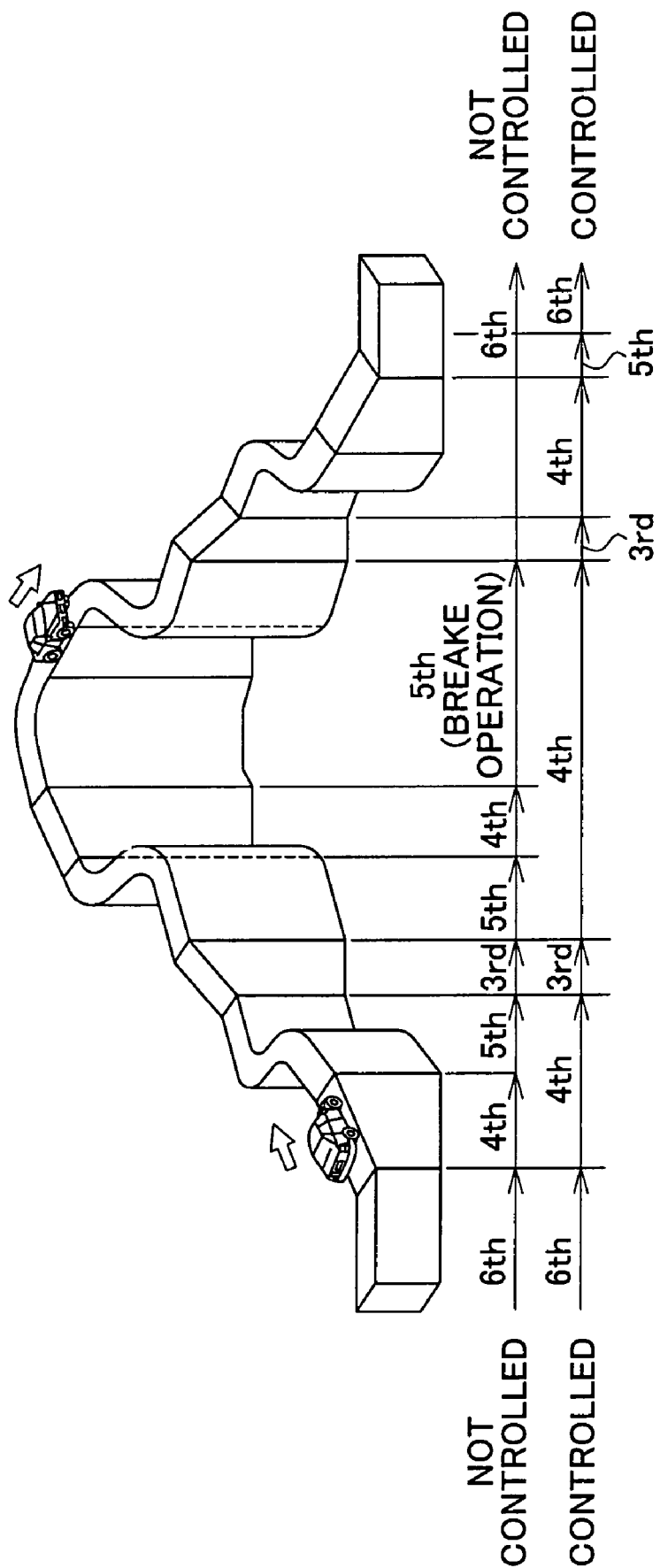
FIG. 7 is a view illustrating one example of the AI shift control that the AI shift controlling means shown in FIG. 5 performs when the vehicle is running on an uphill road, in comparison with the case in which the AI shift control is not performed.

FIG. 7 is a view illustrating one example of the AI shift control that is performed when the vehicle is running on an uphill road. In FIG. 7, "NOT CONTROLLED" represents the shift control that is performed by the regular shift controlling means 104 only and "CONTROLLED" represents the shift control that is performed also using the AI shift controlling means 110. In this AI shift control, the AI shift controlling means 110 detects, from the throttle opening degree $\theta_{TH}$ and the vehicle speed V, that the vehicle is running on an uphill road or a down hill road. When it is detected that the vehicle is running on an uphill road or a down hill road, the AI shift controlling means 110 prohibits the use of the n speed or speeds higher than the n gear that is determined based on the inclination of the road, etc. As is evident from FIG. 7, the AI shift control reduces the number of upshifts and downshifts of the automatic transmission 10 to diminish the feeling of busy shifting. Further, the AI shift control suppresses the reduction of the drive power that is caused by the automatic transmission 10 being shifted up when the vehicle is running on an uphill road, and produces more appropriate engine brake by shifting the automatic transmission 10 down when the vehicle is running a downhill road.

Back to FIG. 5, the AI shift execution controlling means 112 determines whether to perform the AI shift control using the AI shift controlling means 110. The AI shift execution controlling means 112 is provided with, as its functional components, an in-S-mode execution switch 114 and AI shift limiting means 116, and performs signal processing according to the flowchart of FIG. 8. The in-S-mode execution switch 114 is used to determine, on a specific program, whether to activate the AI shift control by the AI shift controlling means 110 in the S mode (AI shift control: ON or OFF). For example, it may be appropriate not to activate the AI shift control by the AI shift controlling means 110 in the S mode if the vehicle is a vehicle designed to enjoy sports driving. However, in this exemplary embodiment, the in-S-mode execution switch 114 is turned to ON in the S mode, that is, the AI shift control is performed in the S mode. However, even if the in-S-mode execution switch 114 is ON, the AI shift limiting means 116 cancels the prohibition (e.g., n speed prohibition) put on the AI shift control by the AI shift controlling means 110 when the vehicle speed V is equal to or higher than a reference vehicle speed Vn. Step 8 and step 9 in the flowchart of FIG. 8 are executed by the AI shift limiting means 116.

Figure 8:
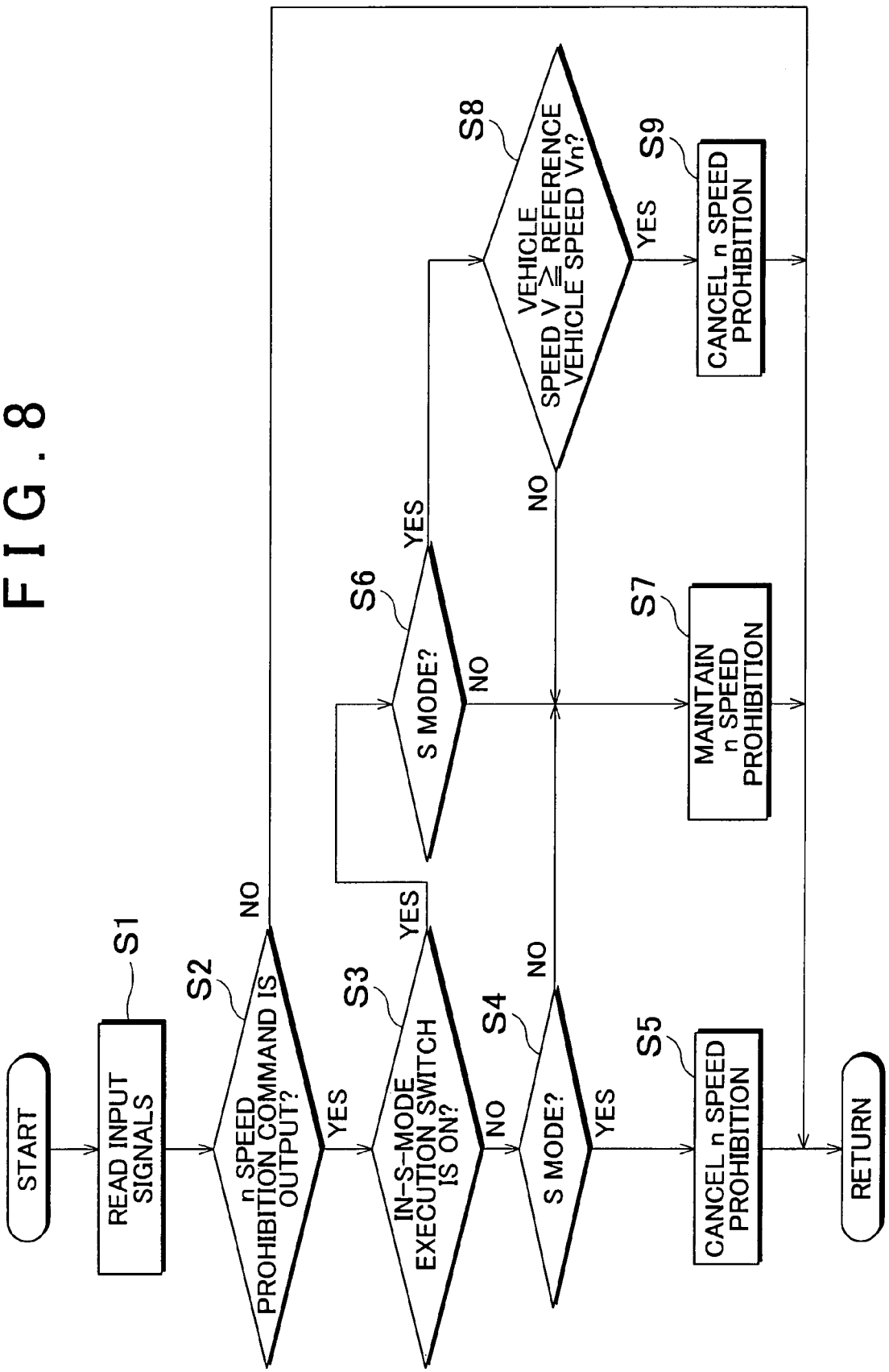
FIG. 8 is a flowchart illustrating the operation of the AI shift execution controlling means.

Referring to FIG. 8, in step 1, the signals indicating the vehicle speed V and the signals indicating the lever position $P_{SH}$, which are referenced to determine if the S mode is activated, are read. In step 2, it is determined whether the AI shift controlling means 110 is outputting an n speed prohibition command that prohibits the use of the n speed or speeds higher than the n speed. If it is determined that the AI shift controlling means 110 is not outputting the n speed prohibition command, the routine ends. In this case, the regular shift controlling means 104 controls the shifting of the automatic transmission 10 according to the shift map of FIG. 6A using the shift ranges set in the automatic shift mode or in the S mode.

On the other hand, if it is determined in step 2 that the AI shift controlling means 110 is outputting the n speed prohibition command, step 3 and its subsequent steps are then executed as follows. First, it is determined in step 3 whether the in-S-mode execution switch 114 is ON. If the in-S-mode execution switch 114 is not ON, that is, if the AI shift control by the AI shift controlling means 110 is set not to be activated in the S mode, it is then determined in step 4 whether the S mode is presently set. If the S mode is presently set, the n speed prohibition command is cancelled in step 5. In this way, despite the n speed prohibition command output from the AI shift controlling means 110, the regular shift controlling means 104 controls the shifting of the automatic transmission 10 according to the shift map of FIG. 6A using a shift range that is selected by the driver in the S mode. On the other hand, if it is determined in step 4 that the S mode is not presently set, that is, if the automatic shift mode is presently set, step 7 is executed after step 4, so that the use of the n speed or speeds higher than the n speed is prohibited in accordance with the n speed prohibition command and the automatic transmission 10 is held at a speed that is lower than the n speed or shifted down to the n−1 speed.

On the other hand, if the in-S-mode execution switch 114 is ON and "YES" is obtained in step 3, step 6 and its subsequent steps are then executed as follows. In step 6, it is determined whether the S mode is presently set. If not, that is, if the automatic shift mode is presently set, the use of the n speed or speeds higher than the n speed is prohibited in accordance with the n speed prohibition command, so that the automatic transmission 10 is held at a speed that is lower than the n speed or shifted down to the n−1 speed.

On the other hand, if it is determined in step 6 that the S mode is presently set and "YES" is obtained in step 6, step 8 is then executed. In step 8, it is determined whether the present vehicle speed V is equal to or higher than the reference vehicle speed Vn. If V<Vn, step 7 is executed to prohibit the use of the n speed and the speed or speeds higher than the n speed according to the n speed prohibition command output from the AI shift controlling means 110, so that the automatic transmission 10 is maintained at a speed lower than the n speed or shifted down to the n−1 speed. If V≧Vn, conversely, step 9 is executed to cancel the n speed prohibition command. In this case, despite the n speed prohibition command output from the AI shift controlling means 110, the regular shift controlling means 104 controls the shifting of the automatic transmission 10 according to the shift map of FIG. 6A using a shift range that is selected by the driver in the S mode.

Figure 9:
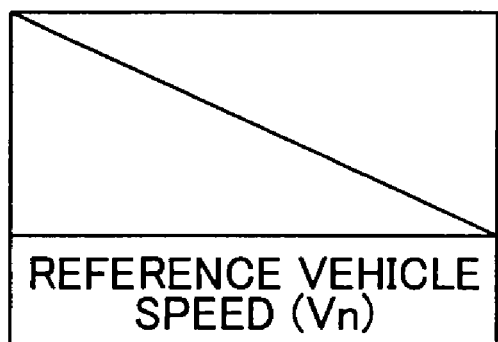
FIG. 9 is a table showing an example for setting the reference vehicle speed Vn used in step 8 of the flowchart of FIG. 8.

The reference vehicle speed Vn is set for each n speed that the AI shift controlling means 110 prohibits to be used, as shown in FIG. 9. The reference speed Vn for each n speed is determined such that the n speed prohibition command is cancelled in step 9 when the vehicle speed V is in the range in which the engine 30 is placed in a predetermined driven state (engine brake state) if the use of a specific speed or speeds is limited in accordance with the n speed prohibition command from the AI shift controlling means 110. Thus, the prohibition of the use of the n speed or speeds higher than the n speed is canceled in step 9 due to the vehicle speed V being within the range in which the engine 30 is placed in the predetermined driven-state. As such, the drive power source brake controlling function of the AI shift controlling means 110 is limited accordingly, which minimizes or eliminates the possibility that the driver would feel uncomfortable due to a large engine brake force being produced when the automatic transmission 10 is automatically shifted down in the S mode despite the fact that the S mode allows the driver to select the speed of the automatic transmission 10 as he or she intends. In this exemplary embodiment, the n speed is set to the third speed "3rd" or higher, and therefore the reference speed Vn is set only for the third speed and higher.

The reference vehicle speed Vn for each n speed is not necessarily set so as to deactivate the drive power source brake controlling function of the AI shift controlling means 110 completely. That is, the reference vehicle speed Vn for each n speed may be set so as to deactivate only a part of the drive power source brake controlling function of the AI shift controlling means 110. For example, the reference vehicle speed Vn for each n speed may be set so as to limit the use of the drive power source brake controlling function of the AI shift controlling means 110 such that, when the driver releases the accelerator pedal quickly while the vehicle is cornering, the drive power source brake controlling function is activated to hold the automatic transmission 10 at a specific speed so as to apply a certain level of engine brake to the vehicle, but when the vehicle is running on a downhill road and there is a possibility that a large engine brake force would occur if the automatic transmission 10 is automatically shifted down, the drive power source brake controlling function is not activated. Also, it is possible to set the reference vehicle speed Vn so as to obtain a desired busy-shifting preventing function, by factoring in the type and characteristic of the vehicle, the functions of the AI shift controlling means 110, and so on. In any case, the drive power source brake controlling function is limited according to the reference vehicle speed Vn.

Meanwhile, the reference vehicle speed Vn for each n speed may be set to a constant speed on the assumption that the accelerator pedal is fully released. However, because there is a case where engine brake force occurs even while the accelerator pedal is being operated, the reference vehicle speed Vn for each n speed may be variably set using the accelerator operation amount Acc as a parameter. In the case where it is sufficient to deactivate the drive power source brake controlling function of the AI shift controlling means 110 only when the accelerator pedal is fully released, the reference vehicle speed Vn for each n speed may be set to a constant speed at which the engine 30 is placed in a driven state if the accelerator pedal is fully released, and step 8 and its subsequent steps may be executed only when the accelerator pedal is fully released in the S mode.

According to the shift control apparatus for an automatic transmission of a vehicle of the exemplary embodiment, as described above, when the vehicle speed V is lower than the reference vehicle speed Vn during the S mode, such as when the vehicle is running on the drive power of the engine 30 (power-ON drive) where no engine brake force occurs, the AI shift control, with the prohibition of the use of the n speed or speeds higher than the n speed, is performed by the AI shift controlling means 110 in step 7. As such, busy shifting of the automatic transmission 10 can be prevented based on the drive conditions of the vehicle and the driver's operations when the vehicle is running on an uphill road or cornering.

On the other hand, if it is determined in step 8 that the vehicle speed V is equal to or higher than the reference vehicle speed Vn, step 9 is executed to cancel the prohibition of the use of the n speed or speeds higher than the n speed (e.g., n speed prohibition) by the AI shift controlling means 110, thus preventing an unintended strong engine brake force from being generated by the automatic transmission 10 being shifted down or being held at a specific speed under the prohibition of the use of the n speed or speeds higher than the n speed. That is, because engine brake force occurs only when the vehicle speed is higher than a specific speed that is defined by the throttle opening degree $\theta_{TH}$, the speed ratio of the automatic transmission 10, and so on, by setting the reference vehicle speed Vn appropriately, it is possible to deactivate or limit the drive power source brake controlling function of the AI shift controlling means 110 while maintaining a predetermined busy-shifting preventing function of the AI shift controlling means 110. More specifically, for example, it is possible to avoid execution of the AI shift control, the prohibition of the use of the n speed or speeds higher than the n speed, in the vehicle speed range in which the engine 30 is placed in a predetermined driven state, by setting the reference vehicle speed Vn such that the n speed prohibition command from the AI shift controlling means 110 is cancelled when the vehicle speed V is in that vehicle speed range. Thus, the drive power source brake controlling function of the AI shift controlling means 110 is deactivated or limited while maintaining the predetermined busy-shifting preventing function of the AI shift controlling means 110, thus preventing generation of an unintended strong engine brake force.

As mentioned above, the AI shift controlling means 110 has the busy-shifting preventing function and the drive power source brake controlling function and these functions cooperate with each other under given conditions, such as when the vehicle is running on an uphill road, when the vehicle is cornering, and when the driver quickly releases the accelerator pedal. Therefore, when the drive power source brake controlling function is limited, the busy-shifting preventing function may be affected in some way. However, by setting the reference vehicle speed Vn appropriately, the busy-shifting preventing function can be effectively used to avoid busy shifting, for example, when the vehicle is running on the drive power of the engine 30 (power-ON drive) on a flat road.

Accordingly, in the exemplary embodiment, a busy-shifting preventing function for the S mode can be obtained by performing the AI shift control by the AI shift controlling means 110 in the S mode as well as in the automatic shift mode and canceling, during the S mode, the n speed prohibition by the AI shift controlling means 110 in response to the vehicle speed V reaching the reference vehicle speed Vn. As such, in the exemplary embodiment, a busy-shifting preventing function for the S mode can be obtained in a simple manner and at a low cost as compared to when a new control program for preventing busy shifting of the automatic transmission 10 in the S mode is additionally prepared and when the busy-shifting preventing function is extracted from the functions of the AI shift controlling means 110 and is executed in the S mode.

Also, in the exemplary embodiment, owing to the in-S-mode execution switch 114 provided in the AI shift execution controlling means 112, whether to perform the AI shift control by the AI shift controlling means 110 in the S mode can be decided when programming the program, and therefore a common program can be used regardless of whether the AI shift control needs to be performed by the AI shift controlling means 110 in the S mode, and thus the cost for programming the program decreases.

Figure 10:
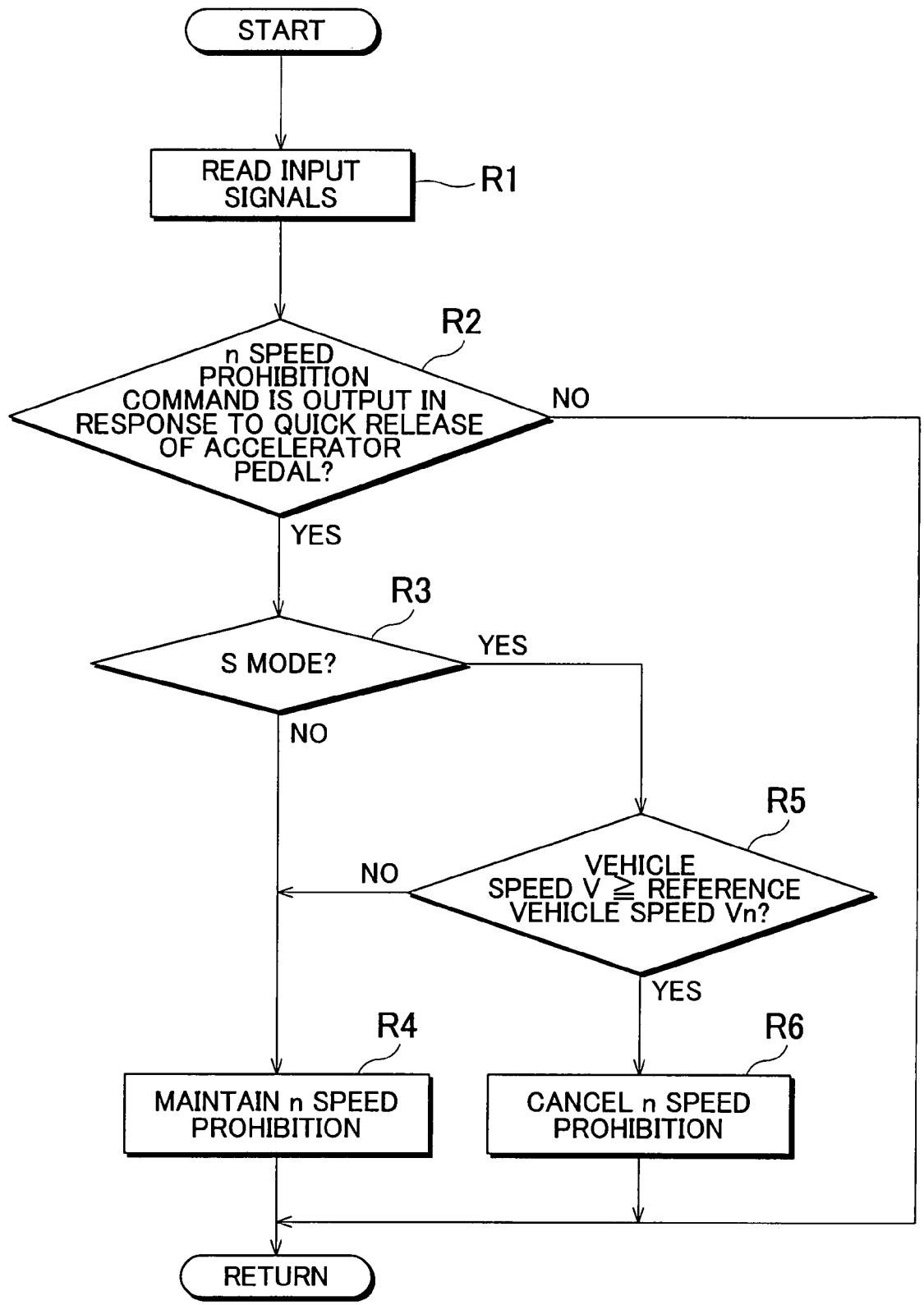
FIG. 10 is a flowchart that is used in another exemplary embodiment of the invention instead of the flowchart shown in FIG. 8.

Next, another exemplary embodiment of the invention will be described. FIG. 10 is a flowchart of a control routine that is executed by the AI shift controlling means 110 that does not have the in-S-mode execution switch 114. In step R1, the predetermined input signals are read as they are in step 1 described above. In step R2, it is determined whether the n speed prohibition command has been output from the AI shift controlling means 110 in response to the accelerator pedal being quickly released. If it is determined in this step that the n speed prohibition command has been output in response to the accelerator pedal being quickly released, step R3 and its subsequent steps are executed so as to limit the AI shift control under given conditions. Conversely, if it is determined in step R2 that the n speed prohibition command has not been output in response to the accelerator pedal being quickly released, the routine ends at once. Thus, according to this routine, the AI shift control is performed in a regular manner in the S mode as well as in the automatic shift mode, if the AI shift control is activated in response to an event other than a quick release of the accelerator pedal, i.e., the use of the n speed or speeds higher than the n speed is prohibited in response to an event other than a quick release of the accelerator pedal.

Steps R3 to R6 are substantially the same as steps S6 to S9 in the routine of FIG. 8. Thus, if the vehicle speed V is lower than the reference vehicle speed Vn, step R4 is executed even in the S mode, so that the AI shift controlling means 110 performs the AI shift control while prohibiting the use of the n speed or speeds higher than the n speed. On the other hand, if the vehicle speed V is equal to or higher than the reference vehicle speed Vn in the S mode, the n speed prohibition command is canceled to remove the restriction on the AI shift control. In this case, the reference vehicle speed Vn is set such that "YES" is obtained in step R5 when the vehicle speed V is in the range in which the engine 30 is placed in a driven state if the accelerator pedal is fully released.

In this exemplary embodiment, the AI shift control is performed in a regular manner in the S mode as well as in the automatic shift mode, if the AI shift control has been activated in response to an event other than a quick release of the accelerator pedal, i.e., the use of the n speed and the speed or speeds higher than the n speed has been prohibited in response to an event other than a quick release of the accelerator pedal. However, even when the AI shift control has been activated in response to a quick release of the accelerator pedal, the AI shift control, with the prohibition of the use of the n speed and the speed or speeds higher than the n speed, is performed by the AI shift controlling means 110 in step R4, and this provides the advantage that busy shifting of the automatic transmission 10 can be appropriately prevented based on the drive conditions of the vehicle and the driver's operations when the vehicle is running on an uphill road and when the vehicle is cornering, as in the case of the exemplary embodiment described earlier. In particular, when activated in response to an event other than a quick release of the accelerator, the AI shift control is performed in a regular manner regardless of whether the shift control mode is the S mode or the automatic shift mode, and therefore the shifting of the automatic transmission 10 can be more appropriately controlled in the S mode while limiting the function for controlling the drive power source brake, thereby preventing busy shifting that may make the driver feel unconformable and achieving a vehicle drive state that meets the intention of the driver, which leads to an improvement of the driveability of the vehicle.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the scope of the invention.

What is claimed is:

1. A shift control apparatus for an automatic transmission for a vehicle, the automatic transmission having an automatic shift mode in which the automatic transmission is automatically shifted using an entire shift range of the automatic transmission in a predetermined shift manner and a manual shift mode in which the shift range of the automatic shifting that is performed in the predetermined shift manner is limited in response to a manual operation of a driver, a shift manner changing portion that changes the shift manner based on at least one of a running condition of a vehicle and an operation by the driver so that AI shift control, for preventing busy-shifting of the automatic transmission caused when the automatic transmission is automatically shifted, and for obtaining a predetermined drive power source brake force, is executed, the automatic shift mode and the manual shift mode being selectable by the driver; and a change limiting portion that prohibits the shift manner to be changed by the shift manner changing portion, wherein the shift manner changing portion changes the shift manner so that the AI shift control is executed in both the automatic shift mode and the manual shift mode, and wherein the change limiting portion's prohibition of a change in the shift manner made by the shift manner changing portion is canceled so that the AI shift control is executed without the prohibition when a speed of the vehicle is equal to or higher than a reference vehicle speed in the manual shift mode.

2. The shift control apparatus according to claim 1, wherein the reference vehicle speed is set such that the shift manner is prohibited to be changed by the shift manner changing portion when the speed of the vehicle is in a vehicle speed range in which a drive power source is placed in a predetermined driven state if the shift manner is changed.

3. The shift control apparatus according to claim 1, wherein the shift manner changing portion has a busy-shifting prevention function for changing the shift manner so as to prevent busy shifting of the automatic transmission that is caused when the automatic transmission is automatically shifted and a drive power source brake control function for changing the shift manner so as to obtain a desired drive power source brake force, the busy-shifting prevention function and the drive power source brake control function being performed cooperatively.

* * * * *

UNITED STATES PATENT AND TRADEMARK OFFICE
CERTIFICATE OF CORRECTION

| | |
|---|---|
| PATENT NO. | : 7,695,404 B2 |
| APPLICATION NO. | : 11/797711 |
| DATED | : April 13, 2010 |
| INVENTOR(S) | : Hidenori Saitoh et al. |

It is certified that error appears in the above-identified patent and that said Letters Patent is hereby corrected as shown below:

| Column | Line | |
|---|---|---|
| 15 | 4 | Before "the prohibition" insert --with--. |

Signed and Sealed this

Twenty-seventh Day of July, 2010

David J. Kappos
*Director of the United States Patent and Trademark Office*